(12) United States Patent
Yamagishi

(10) Patent No.: US 8,938,762 B2
(45) Date of Patent: Jan. 20, 2015

(54) TELEVISION BROADCAST RECEIVING DEVICE OF GENERATING INFORMATION FOR OBTAINING WEBPAGE INFORMATION, METHOD OF GENERATING ACQUISITION OBJECTIVE INFORMATION, PROGRAM, APPARATUS OF GENERATING ACQUISITION OBJECTIVE INFORMATION, AND TELEVISION BROADCASTING SYSTEM

(71) Applicant: JVC KENWOOD Corporation, Yokohama-shi (JP)

(72) Inventor: Toru Yamagishi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 13/652,202

(22) Filed: Oct. 15, 2012

(65) Prior Publication Data

US 2013/0042273 A1 Feb. 14, 2013

Related U.S. Application Data

(63) Continuation of application No. PCT/JP2011/000664, filed on Feb. 7, 2011.

(30) Foreign Application Priority Data

Apr. 16, 2010 (JP) ................................. 2010-094709

(51) Int. Cl.
*H04N 21/8405* (2011.01)
*H04H 20/93* (2008.01)
(Continued)

(52) U.S. Cl.
CPC ........... *H04N 21/8405* (2013.01); *H04H 20/93* (2013.01); *H04H 60/72* (2013.01);
(Continued)

(58) Field of Classification Search
USPC ................................................. 725/53, 34.46
See application file for complete search history.

(56) References Cited

U.S. PATENT DOCUMENTS 6,005,565 A * 12/1999 Legall et al. .................. 715/721
2007/0199017 A1 * 8/2007 Cozen et al. ..................... 725/35

FOREIGN PATENT DOCUMENTS

| JP | 10-155119 A | 6/1998 |
| JP | 10-307795 A | 11/1998 |

(Continued)

OTHER PUBLICATIONS

Notification of Reasons for Refusal issued in Japanese Patent Application No. 2010-094709 dated Sep. 17, 2013.

*Primary Examiner* — Jivka Rabovianski
(74) *Attorney, Agent, or Firm* — Venable LLP; Michael A. Sartori; F. Brock Riggs

(57) ABSTRACT

A television broadcast receiving device includes a program selecting unit that accepts the selection of one of programs in a program list; an extracting unit that extracts a keyword related to the accepted program from the program information; a site information obtaining unit that obtains names and address information of web sites and a rule for generating acquisition objective information for obtaining information of a webpage related to a keyword extracted from one of one or plural web sites; a site name display controller that displays the obtained names of one or plural web sites on a display device; a site name selecting unit that accepts the selection of a name of one web site among the displayed names of the one or plural web sites; and a generating unit that generates acquisition objective information in accordance with the rule.

4 Claims, 15 Drawing Sheets

(51) Int. Cl.
*H04H 60/72* (2008.01)
*H04H 60/82* (2008.01)
*H04N 21/4722* (2011.01)
*H04N 21/858* (2011.01)
*H04N 21/4782* (2011.01)
*H04H 60/87* (2008.01)

(52) U.S. Cl.
CPC .......... *H04H 60/82* (2013.01); *H04N 21/4722* (2013.01); *H04N 21/8586* (2013.01); *H04N 21/4782* (2013.01); *H04H 60/87* (2013.01); *H04H 2201/37* (2013.01)

USPC .................................. 725/53; 725/34; 725/46

(56) References Cited

FOREIGN PATENT DOCUMENTS

| | | |
|---|---|---|
| JP | 2002-515207 A | 5/2001 |
| JP | 2003-223586 A | 8/2003 |
| JP | 2008-78946 A | 4/2008 |
| JP | 2010-62963 A | 3/2010 |
| JP | 2010-087976 A | 4/2010 |

* cited by examiner

FIG.5

```
<html>
<head>
<meta encode="SJIS" shopping-site1=" LAPLATA .co.jp" start="http://www.laplata.co.jp/s/
keywords=" tail="" />
<meta shopping-site1="mahoo shopping" start="http://shopping.mahoo.co.jp/search?p="
tail="" encode="EUC" />
<meta encode="SJIS" shopping-site1=" NEDAN. com "
start="http://nedan.com/tv/search/kw=" tail="/" />
<meta shopping-site1="bitter" start="http://www.bitter.co.jp/dap/sv/list1?keyword=
" tail="" />
</head>
<body> OMITTED
```

FIG.11

```
<html>
<head>
<meta shopping-site1="LAPLATA .co.jp" />
<meta shopping-site1="mahoo shopping" />
<meta shopping-site1="NEDAN .com" />
<meta shopping-site1="bitter" />
</head>
<body> OMITTED
```

FIG.15

```
<html>
<head>
<meta encode="SJIS" shopping-site1=" LAPLATA  .co.jp" start="http://www.laplata.co.jp/s/
 keywords=" tail="" affiliate="&afid=abcd1234"/>
<meta shopping-site1="mahoo shopping" start="http://shopping.mahoo.co.jp/search?p="
tail="" encode="EUC" />
<meta encode="SJIS" shopping-site1="NEDAN .com"
start="http://nedan.com/tv/search/kw=" tail="/" />
<meta shopping-site1="bitter" start="http://www.bitter.co.jp/dap/sv/list1?keyword=
" tail="" />
< /head>
<body> OMITTED
```

TELEVISION BROADCAST RECEIVING DEVICE OF GENERATING INFORMATION FOR OBTAINING WEBPAGE INFORMATION, METHOD OF GENERATING ACQUISITION OBJECTIVE INFORMATION, PROGRAM, APPARATUS OF GENERATING ACQUISITION OBJECTIVE INFORMATION, AND TELEVISION BROADCASTING SYSTEM

CROSS-REFERENCE TO RELATED APPLICATIONS

This application is based upon and claims the benefit of priority from the prior Japanese Patent Application No. 2010-094709, filed on Apr. 16, 2010 and International Patent Application No. PCT/JP2011/000664, filed on Feb. 7, 2011, the entire contents of which are incorporated herein by reference.

BACKGROUND OF THE INVENTION

1. Field of the Invention

The present invention relates to a technology that creates information for allowing a television broadcast receiving device to obtain webpage information.

2. Description of the Related Art

Recently, digital broadcasting started and program information is received by a television broadcast receiving device together with the digital broadcasting. However, many people search for things related to a watching program using a personal computer while watching the television program. Therefore, the combining of the television broadcast receiving device and search function becomes an important factor.

So far, a technology that combines reception and search of a television broadcasting signal is suggested. For example, a technology in which a user memorizes a URL that indicates a manipulating status together with a query string and then accesses the URL later in order to access the URL in the same status as the previous access status is suggested (see Japanese Patent Application Laid-Open No. 10-307795).

CITATION LIST

Patent Literature

Patent Literature 1: Japanese Patent Application Laid-Open No. 10-307795

When a user does the shopping based on the program information, the information to be searched such as a name of a program or a performer is varied and thus the query string needs to be correspondingly changed. Further, at a site to be searched, the configuration of the query strings may vary with time. In a technology of the related art, the above-mentioned problems cannot be solved. In other words, the related art that performs searching using Internet based on the program information is not convenient for the user.

SUMMARY OF THE INVENTION

The present invention is directed to a technology that increases the convenience of the user as compared with the related art when the user performs a search using the Internet, based on the program information.

To solve the above-described problems and to achieve the above-described object, a television broadcast receiving device according to an aspect of the invention includes: a receiving unit configured to receive a television broadcasting signal; an image display controller configured to decode image data of a program included in the television broadcasting signal received by the receiving unit to display an image on a display device; a program information obtaining unit configured to obtain program information including at least a broadcasting start time and a program name of the program which is included in the television broadcasting signal to be broadcasted; a program list display controller configured to generate a program list based on the program information obtained by the program information obtaining unit and display the generated program list on the display device; a program selecting unit configured to select one of programs in the program list displayed by the display device based on the external manipulation; an extracting unit configured to extract a keyword related to the program selected by the program selecting unit from the program information obtained by the program information obtaining unit; a site information obtaining unit configured to obtain names and address information of one or plural web sites and an acquisition objective information generating rule for every one or plural web sites for generating acquisition objective information for obtaining information of a webpage related to the keyword by directly searching the keyword extracted by the extracting unit from HTTP servers; a site name display controller configured to display the names of one or plural web sites obtained by the site information obtaining unit on the display device; a site name selecting unit configured to select a name of one web site among the names of the one or plural web sites displayed by the display device based on external manipulation; and a generator configured to generate acquisition objective information for directly obtaining information of a webpage related to the keyword by directly searching the keyword extracted by the extracting unit in the web site having the name selected by the site name selecting unit using the address information obtained by the site information obtaining unit, in accordance with the acquisition objective information generating rule obtained by the site information obtaining unit.

A television broadcast receiving device according to another aspect of the invention includes: a broadcasting signal receiving unit configured to receive a television broadcasting signal; an image display controller configured to decode image data of a program included in the television broadcasting signal received by the broadcasting signal receiving unit to display an image on a display device; a program information obtaining unit configured to obtain program information including at least a broadcasting start time and a program name of a program which is included in the television broadcasting signal to be broadcasted; a program list display controller configured to generate a program list based on the program information obtained by the program information obtaining unit and display the generated program list on the display device; a program selecting unit configured to select one of programs in the program list displayed by the display device based on the external manipulation; an extracting unit configured to extract a keyword related to the program selected by the program selecting unit from the program information obtained by the program information obtaining unit; a site information obtaining unit configured to obtain names of one or plural web sites; a site name display controller configured to display the names of one or plural web sites obtained by the site information obtaining unit on the display device; a site name selecting unit configured to select a name of one web site among the names of the one or plural web sites displayed by the display device based on external manipulation; a transmitting unit configured to transmit the name of the web site selected by the site name selecting unit and the keyword extracted by the extracting unit to an HTTP server;

and an access information receiving unit configured to receive acquisition objective information for obtaining information of a webpage related to the keyword by directly searching the keyword extracted by the extracting unit in the web site having the name selected by the site name selecting unit from the HTTP server.

An acquisition objective information generating device according to still another aspect of the invention includes: a storing unit configured to store names and address information of one or plural web sites and an acquisition objective information generating rule for generating acquisition objective information for obtaining information of a webpage related to an assigned keyword by directly searching the assigned keyword for every one or plural websites; a site information transmitting unit configured to transmit the names of the one or plural web sites stored by the storing unit to a television broadcast receiving device; a receiving unit configured to receive the name of the web site and the keyword from the television broadcast receiving device; a generating unit configured to generate acquisition objective information for obtaining information of a webpage related to the keyword by directly searching the keyword received by the receiving unit in a web site having the name received by the receiving unit in accordance with the acquisition objective information generating rule stored by the storing unit; and an access information transmitting unit configured to transmit the acquisition objective information generated by the generating unit to the television broadcast receiving device.

A television broadcasting system according to still another aspect of the invention includes: a television broadcast receiving device configured to receive a television broadcasting signal and decode image data of a program included in the received television broadcasting signal to display an image on a display device; and an acquisition objective information generating device configured to be an HTTP server that stores names and address information of one or plural web sites, wherein the television broadcast receiving device obtains program information including at least a broadcasting start time and a program name of a program which is included in the television broadcasting signal to be broadcasted; generates a program list based on the obtained program information; displays the generated program list on the display device; selects one of programs in the program list displayed by the display device based on the external manipulation; extracts a keyword related to the program selected from the obtained program information based on the external manipulation; obtains names of one or plural web sites from the acquisition objective information generating device; displays the obtained names of one or plural web sites on the display device; selects a name of one web site among the names of the one or plural web sites displayed by the display device based on the external manipulation; and transmits the name of the selected web site and the extracted keyword to the acquisition objective information generating device, the acquisition objective information generating device stores acquisition objective information generating rule for generating acquisition objective information for obtaining information of a webpage related to an assigned keyword by directly searching the assigned keyword for one or plural websites; receives the name of the web site and the keyword from the television broadcast receiving device; generates acquisition objective information for obtaining information of a webpage related to the keyword by directly searching the received keyword in a web site having the received name in accordance with the acquisition objective information generating rule; and transmits the generated acquisition objective information to the television broadcast receiving device, and the television broadcast receiving device receives the acquisition objective information generated from the acquisition objective information generating device.

BRIEF DESCRIPTION OF THE DRAWINGS

FIG. 5 is a view illustrating an example of names and address information of the four shopping sites and an acquisition objective information generating rule;

FIG. 11 is a view illustrating contents of a text file of shoppingsite.html that specifies the names of the four shopping sites stored by the storing unit of the acquisition objective information generating device of FIG. 9;

FIG. 15 is a view illustrating an example of an html text including information for generating acquisition objective information.

DETAILED DESCRIPTION OF THE INVENTION

The invention will now be described by reference to the preferred embodiments. This does not intend to limit the scope of the present invention, but to exemplify the invention.

Hereinafter, embodiments of the present invention will be described with reference to the drawings.

First Embodiment

Figure 1:
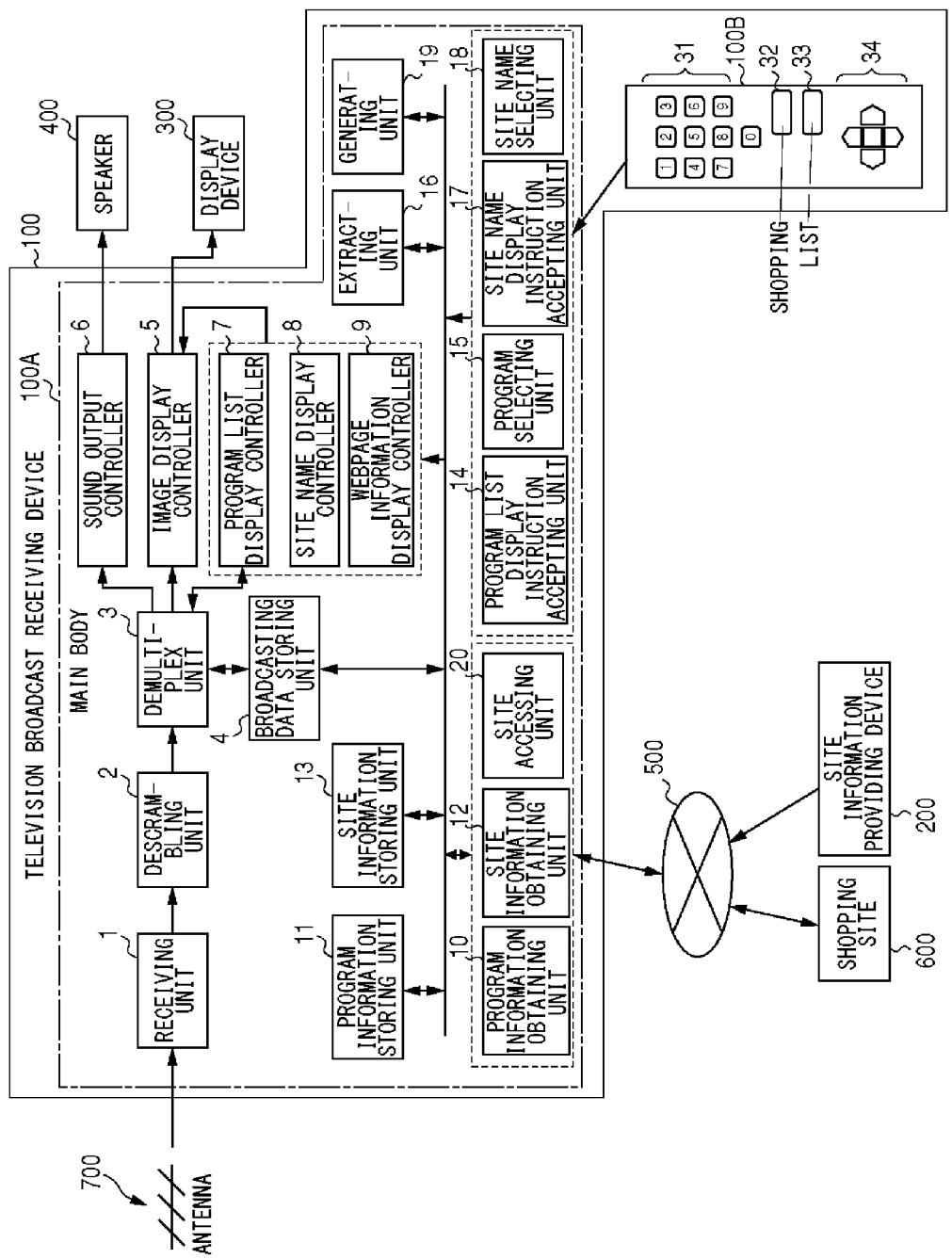
FIG. 1 is a first configuration view of a television broadcasting system according to a first embodiment.

First, a configuration of a television broadcasting system according to a first embodiment will be described with reference to FIG. 1. FIG. 1 is a configuration view of the television broadcasting system according to a first embodiment.

As illustrated in FIG. 1, the television broadcasting system according to the first embodiment includes a television broadcast receiving device 100 and a site information providing device 200. In FIG. 1, as external devices of the television broadcasting system, an antenna 700, a display device 300, a speaker 400, an Internet 500, and a shopping site 600 are displayed. The television broadcast receiving device 100, the site information providing device 200, and the shopping site 600 are connected to the Internet 500. The antenna 700, the display device 300, and the speaker 400 are connected to the television broadcast receiving device 100. The shopping site 600 is a web site for implementing the shopping to be done through the Internet 500. Further, FIG. 1 is a configuration view of the television broadcasting system according to the first embodiment focused on a function of the television broadcast receiving device 100.

The television broadcast receiving device 100 is a device that receives and decodes a digital television broadcasting signal and accesses the shopping site 600. The television broadcast receiving device 100 has a plurality of configuring units. The plurality of configuring units will be described below. The site information providing device 200 stores names and address information of one or more shopping sites. Further, the site information providing device 200 also stores an acquisition objective information generating rule for generating acquisition objective information (URL: uniform resource locator) for obtaining information of a webpage related to a keyword which is assigned to one of one or more shopping sites. In other words, the information of a webpage related to a keyword which is assigned to one of one or more shopping sites is, for example, information obtained by accessing one of one or more shopping sites by the acquisition objective information generated using the acquisition objective information generating rule. Further, information stored by the site information providing device 200 will be described below in detail with reference to FIG. 5.

Next, the configuring units of the television broadcast receiving device 100 will be described. As illustrated in FIG. 1, the television broadcast receiving device 100 is configured by a main body 100A and a remote controller 100B. The main body 100A is a device that performs processings such as receiving or decoding of the television broadcasting signal and the remote controller 100B is a device that receives a control instruction of a user with respect to the processings to be performed by the main body 100A from a user and transmits the instruction to the main body 100A by an infrared ray.

The main body 100A includes a receiving unit 1, a descrambling unit 2, a demultiplex unit 3, a broadcasting data storing unit 4, an image display controller 5, a sound output controller 6, a program list display controller 7, a site name display controller 8, a webpage information display controller 9, a program information obtaining unit 10, a program information storing unit 11, a site information obtaining unit 12, a site information storing unit 13, a program list display instruction accepting unit 14, a program selecting unit 15, an extracting unit 16, a site name display instruction accepting unit 17, a site name selecting unit 18, a generating unit 19, and a site accessing unit 20.

The receiving unit 1 accepts the selection of a channel of a television program which is watched by the user from the user, receives a broadcasting signal of a digital television from the antenna 700, and extracts a signal of a channel selected from the received television broadcasting signals by the user to output the signal to the descrambling unit 2. The receiving unit 1 outputs the television broadcasting signal including the program information and video data and audio data of the channel selected by the user to the descrambling unit 2.

The descrambling unit 2 receives the television broadcasting signal including the video data and audio data of one channel and the program information from the receiving unit 1. If the received television broadcasting signal is a scrambled signal, the descrambling unit 2 descrambles the television broadcasting signal to output the descrambled television broadcasting signal to the demultiplex unit 3. If the television broadcasting signal output from the receiving unit 1 is not a scrambled signal, the descrambling unit 2 outputs the television broadcasting signal from the receiving unit 1 as it is to the demultiplex unit 3.

The demultiplex unit 3 separates the digital television broadcasting signal from the descrambling unit 2 into video data, audio data, and program information to be stored in the broadcasting data storing unit 4. Further, the demultiplex unit 3 outputs the stored video data to the image display controller 5 and outputs the stored audio data to the sound output controller 6.

The image display controller 5 receives and decodes the video data from the demultiplex unit 3 and displays an image corresponding to the decoded video data on the display device 300. Further, the image display controller 5, if necessary, combines the information provided from the program list display controller 7, the site name display controller 8, and the webpage information display controller 9, which will be described below, into the video data or switches the information into the video data to be displayed on the display device 300.

The sound output controller 6 receives and decodes the audio data from the demultiplex unit 3 and outputs the sound corresponding to the decoded audio data outside the speaker 400.

The program list display controller 7 obtains the program information from the broadcasting data storing unit 4 or the program information from the program information storing unit 11, generates the program list from the obtained program information, and display the program list on the display device 300 through the image display controller 5. The details of the program information obtaining unit 10 and the program information storing unit 11 will be described below. The site name display controller 8 obtains the names of one or more shopping sites from the site information storing unit 13 and displays the list of the obtained names of the shopping sites on the display device 300 through the image display controller 5. The details of the site information storing unit 13 will be described below. The webpage information display controller 9 obtains the webpage information related to the keyword assigned to one of one or more shopping sites using the acquisition objective information generated by the generating unit 19 to be displayed on the display device 300 through the image display controller 5.

The program information obtaining unit 10 obtains the program information through the Internet 500. For example, when the power supply of the main body 100A is changed from an off-state to an on-state, that is, the main body 100A is activated, the program information obtaining unit 10 obtains the program information. Further, for example, when the program list display instruction accepting unit 14 accepts the instruction that displays the program list, the program information obtaining unit 10 obtains the program information. Further, the program information includes information such as a broadcasting start time of the program or the program name for generating the program list and additional information such as program explanation of the program. The program information storing unit 11 stores the program information obtained by the program information obtaining unit 10.

The site information obtaining unit 12 stores address information (URL) of the site information providing device 200, accesses the site information providing device 200 through the Internet 500 based on the stored address information, and obtains the name and address information of one or more shopping sites and the acquisition objective information generating rule from the site information providing device 200. For example, when the power supply of the main body 100A is changed from an off-state to an on-state, that is, the main body 100A is activated, the site information obtaining unit 12 obtains the name and address information of one or more shopping sites and the acquisition objective information generating rule. For example, when the program list starts to be displayed on the display device 300 by the control of the program list display controller 7, the site information obtaining unit 12 obtains the name and address information of one or more shopping sites and the acquisition objective information generating rule. For example, when the site name display instruction accepting unit 17 accepts the instruction to display the site name, the site information obtaining unit 12 obtains the name and address information of a registered shopping site and the acquisition objective information generating rule. The site information storing unit 13 stores the name and address information of all shopping sites and the acquisition objective information generating rule obtained by the site information obtaining unit 12. The details of the name and the address information of the shopping site and the acquisition objective information generating rule will be described below with reference to FIG. 5.

Figure 2:
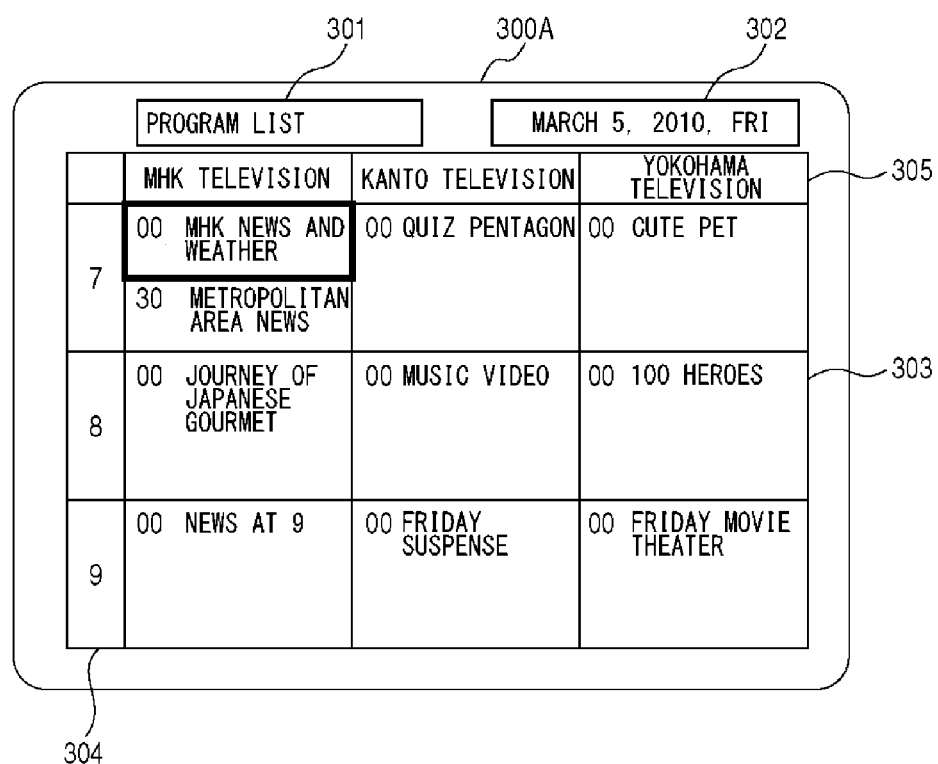
FIG. 2 is a view illustrating an example of a program list displayed on a screen of a display device.

The program list display instruction accepting unit 14 accepts the instruction to display the program list. For example, in order to display the program list, the user presses a program list button 33 of the remote controller 100B. By doing this, a detecting unit which is mounted in the remote controller 100B detects that the program list button 33 is pressed and an infrared transmitting unit which is mounted in the remote controller 100B transmits the instruction to display the program list by the infrared ray. The program list display instruction accepting unit 14 accepts the instruction to display the program list from the remote controller 100B and outputs the instruction to the program list display controller 7. The program list display controller 7 obtains the program information from the broadcasting data storing unit 4 or the program information storing unit 11 in accordance with the instruction to display the program list from the program list display instruction accepting unit 14 and generates a program list from the program information to display the program list on a screen 300A of the display device 300 through the image display controller 5 as illustrated in FIG. 2. FIG. 2 is a view illustrating an example of the program list 303 displayed on the screen 300A of the display device 300.

In FIG. 2, on the screen 300A on which the program list 303 is displayed, a screen title display section 301 is displayed at the upper left side and a time display section 302 is displayed at the upper right side. In the screen title display section 301, character strings called "program list" are displayed, which indicates that the program list 303 is displayed on the screen 300A. In the time display section 302, a current time is displayed. Even though not illustrated in FIG. 1, the television broadcast receiving device 100 includes an RTC (real time clock). The program list display controller 7 obtains the current time from the RTC and the current time is displayed in the time display section 302. The RTC will be described below with reference to FIG. 7.

Below the screen title display section 301 and the time display section 302, that is, in a larger part of the screen 300A, the program list 303 is displayed. The program list 303 is similar to a radio/television section of a newspaper. In the program list 303, a vertical axis 304 indicates a broadcasting time of a program and a horizontal axis 305 illustrates a broadcasting station. In FIG. 2, the program list 303 illustrates names of the programs from 7:00 to 9:00 of three broadcasting stations of MHK television, Kanto television, and Yokohama television and the broadcasting times thereof. Specifically, the program list 303 of FIG. 2 illustrates that MHK television broadcasts a program called "MHK News and Weather" between 7:00 and 7:30 and Kanto television broadcasts a program called "Music Video" between 8:00 and 9:00.

The program list display controller 7 displays a region including a name of any one of selected programs in the program list 303 so as to be distinguished from a region including a name of a program which is not selected. Even when a user does not specifically manipulate, the program list display controller 7 considers that a specific program such as a program having a name written in a left uppermost region of the program list 303 is selected and displays a region having the name of the program which is considered to be selected so as to be distinguished from a region including a name of a program which is not considered to be selected. In FIG. 2, the region including the name of the selected program is surrounded by a thick solid line. In other words, in the program list 303 of FIG. 2, the program called "MHK News and Weather" broadcasted by MHK television between 7:00 and 7:30 is selected and the program list display controller 7 is displayed so as to surround the region including the name of the program by the thick solid line. See FIG. 1, again.

The program selecting unit 15 accepts the selection of one program from the program list 303 displayed on the screen 300A of the display device 300. For example, the program selecting unit 15 accepts the selection of one program of the program list 303 from the remote controller 100B. If the selection of one program is accepted, the program selecting unit 15 outputs the selection result to the program list display controller 7. The program list display controller 7 displays the region including the name of the selected program in accordance with the selection result of one program from the program selecting unit 15 as described above so as to be distinguished from a region including names of the other programs.

For example, the program list 303 is displayed on the screen 300A. If any one program is already selected, the user presses any one of buttons of an arrow keypad 34 of the remote controller 100B. The detecting unit which is not illustrated and mounted in the remote controller 100B detects whether any of upper, lower, left, and right buttons is pressed whenever the button is pressed once. The infrared transmitting unit which is not illustrated and mounted in the remote controller 100B transmits the detecting result to the program selecting unit 15 by the infrared ray. The program selecting unit 15 receives the detecting result from the remote controller 100B and determines a program of a name written in a region which moves up/down or left/right from a region including a name of a program selected from the program list 303 by that time as a newly selected program based on the detecting result and encloses the program with a thick solid line.

Specifically, under the circumstance where the program list 303 of FIG. 2 is displayed and the program having the name of "MHK News and Weather" enclosed by the thick solid line is selected, it is assumed that the user presses a down button of the arrow keypad 34 of the remote controller 100B twice. In this case, the program selecting unit 15 accepts the selection of the program called "Journey of Japanese Gourmet" which is located in two regions below the region including a name of "MHK News and Weather" in the program list 303 of FIG. 2 and is broadcasted between 8:00 and 9:00 by MHK television. By doing this, as illustrated in FIG. 3, the program list display controller 7 displays the region including the name of "Journey of Japanese Gourmet" by enclosing the region with the thick solid line in the program list 303 so as to be distinguished from the regions including names of the other programs in order to indicate that the program of the name of "Journey of Japanese Gourmet" is selected.

The extracting unit 16 extracts a keyword related to the program corresponding to the selection finally accepted by the program selecting unit 15 from the program information stored by the broadcasting data storing unit 4 or from the program information stored by the program information storing unit 11. For example, the keyword related to the program is a name of the program. An extracting rule that specifies whether to extract data of which items related to the program as a keyword is assigned to the extracting unit 16 in advance. The extracting unit 16 extracts the data of any one item related to the program as a keyword in accordance with the extracting rule. The rule may be set or changed by the user.

Figure 3:
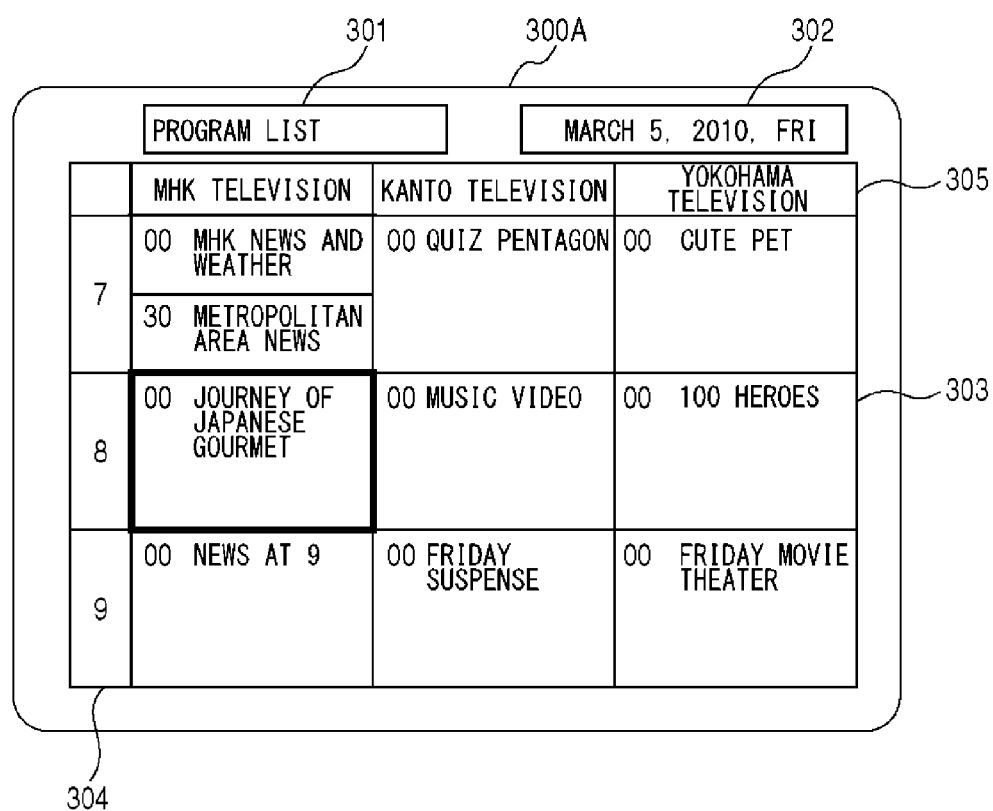
FIG. 3 is a view illustrating a status when a program named "Journey of Japanese Gourmet" in the program list of FIG. 2 is selected.
Figure 4:
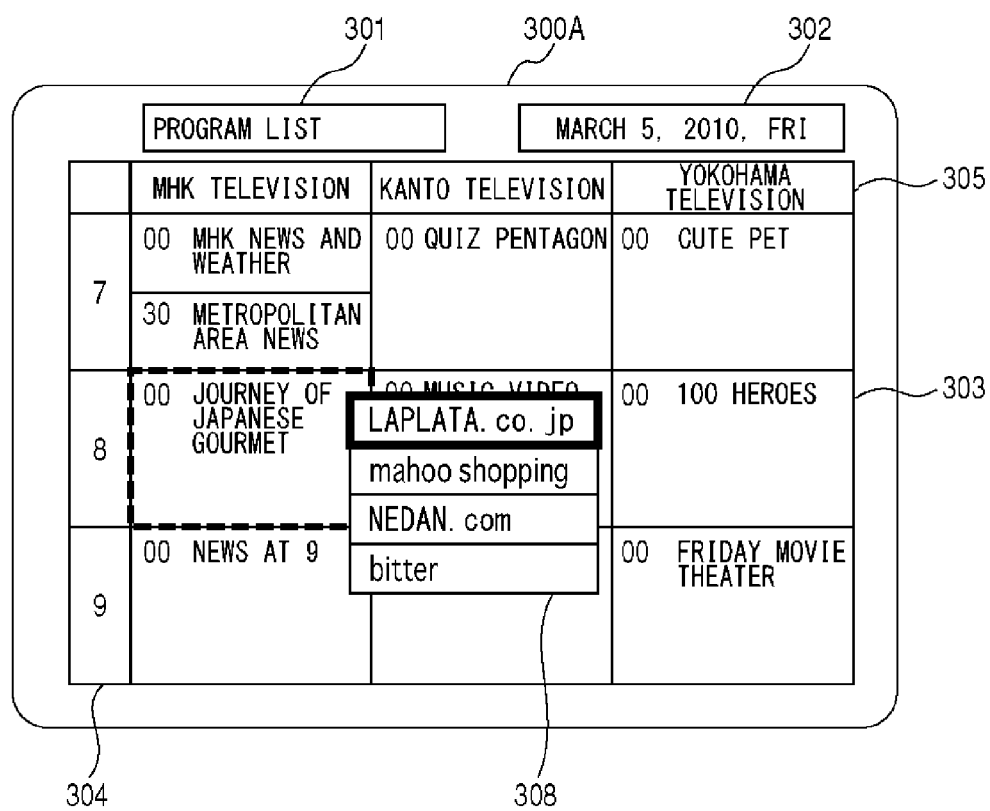
FIG. 4 is a view illustrating an example of a list of names of four shopping sites displayed on the program list of FIG. 3.

After the program selecting unit 15 receives a status where a specific program is selected, as illustrated in FIG. 3, the site name display instruction accepting unit 17 accepts the instruction to display the names of all shopping sites. The user presses the shopping button 32 of the remote controller 100B in order to display the names of the all shopping sites. By doing this, the detecting unit of the remote controller 100B detects that the shopping button 32 of the remote controller 100B is pressed, and the infrared transmitting unit of the remote controller 100B transmits the instruction to display the names of all shopping sites to the site name display instruction accepting unit 17 by the infrared ray. The site name display instruction accepting unit 17 accepts the instruction to display the names of all shopping sites from the remote controller 100B and outputs the instruction to the site name display controller 8. The site name display controller 8 obtains the names of the stored four shopping sites from the site information storing unit 13 in accordance with the instruction to display the names of the all shopping sites. The site name display controller 8, as illustrated in FIG. 4, displays the list 308 of the names of the obtained shopping sites on the program list 303 of the screen 300A of the display device 300. FIG. 4 is a view illustrating an example in which the list 308 of names of shopping sites is displayed on the program list 303 of FIG. 3. See FIG. 1, again.

The site name selecting unit 18 selects and determines a name of one site from the list 308 of the names of the shopping sites displayed on the program list 303 of the screen 300A of the display device 300. First, the site name selecting unit 18 accepts the selection of the name of one of sites in the list 308 of the names of the shopping sites by manipulating the up and down buttons of the arrow keypad 34 of the remote controller 100B by the user. The site name selecting unit 18 outputs information indicating which site's name is selected to the site name display controller 8 in accordance with the name of the selected site. The site name display controller 8 displays the region including the name of the selected site in the list 308 in accordance with the information indicating which site's name is selected from the site name selecting unit 18 so as to be distinguished from the regions including the names of the other sites. For example, the region is displayed so as to be enclosed by the thick solid line in FIG. 4.

Even though the user does not manipulate anything, the site name display controller 8 considers that a name of a specific site such as a name of a site which is written in the uppermost region of the list 308 is selected and displays the region including the name of the site considered to be selected so as to be distinguished from the region including the name of the site which is not considered to be selected. In FIG. 4, the region including the name of the selected site is enclosed by the thick solid line. In other words, in the list 308 of FIG. 4, a name of the site called "laplata.co.jp" is selected and the site name display controller 8 displays the region including the name of the site to be enclosed by the thick solid line. Further, in FIG. 4, the region including the name of the selected program is enclosed by a thick broken line.

Hereinafter, the details thereof will be described. When the list 308 is displayed on the screen 300A and a name of any one of sites is already selected, the user presses an up button or a down button of the arrow keypad 34 of the remote controller 100B. The detecting unit of the remote controller 100B detects which button of the up and down buttons is pressed whenever the button is pressed once, and the infrared transmitting unit of the remote controller 100B transmits the information indicating that the button is pressed by the infrared ray. The site name selecting unit 18 receives the press information from the remote controller 100B and determines the name of the site written in a region that moves to one region up or down from the region including the name of the site which is selected from the list 308 by that time as a name of a newly selected site based on the press information. By doing this, the site name selecting unit 18 accepts the selection of the name of one site from the list 308, and the site name display controller 8 displays the region including the name of the newly selected site so as to be distinguished from the region including the names of the other sites.

Specifically, under the circumstance where the list 308 of FIG. 4 is displayed and the name of the site called "laplata.co.jp" enclosed by the thick solid line is selected, it is assumed that the user presses the down button of the arrow keypad 34 of the remote controller 100B twice. In this case, the site name selecting unit 18 proceeds to a state where a name of a site called "nedan.com" which is located two regions below the region including the name of the site called "laplata.co.jp" is selected from the list 308. By doing this, the site name display controller 8 displays the region including the name of the site called "nedan.com" by enclosing the region with the thick solid line in the list 308 so as to be distinguished from the regions including names of the other sites in order to indicate that the name of the site called "nedan.com" is selected.

If the user determines the name of the site included in the region currently displayed so as to be distinguished from the regions including the names of the other sites as a name of one site which is finally selected in the list 308, the user presses a decision button at the center of the arrow keypad 34 of the remote controller 100B. The site name selecting unit 18 receives a signal indicating that the decision button is pressed from the remote controller 100B and finally accepts the decision of the name of one site from the list 308.

The generating unit 19 generates acquisition objective information (URL) for obtaining information of a webpage related to the keyword extracted by the extracting unit 16 in the shopping site having the name finally determined by the site name selecting unit 18 in accordance with the acquisition objective information generating rule. Further, the acquisition objective information generating rule is an information obtained by the site information obtaining unit 12, and the generating unit 19 obtains the acquisition objective information generating rule from the site information storing unit 13. The function of the generating unit 19 that generates the acquisition objective information will be also described below with reference to FIG. 5 when the name and address information of the shopping sites and the acquisition objective information generating rule which are obtained from the site information providing device 200 by the site information obtaining unit 12 are described.

The site accessing unit 20 obtains the information of the webpage related to the keyword extracted by the extracting unit 16 in the shopping site having the name determined by the site name selecting unit 18 using the acquisition objective information (URL) generated by the generating unit 19 through the Internet 500 and outputs the obtained information to the webpage information display controller 9. The webpage information display controller 9 receives the information of the webpage related to the keyword extracted by the extracting unit 16 in the shopping site having the name which is determined by the site name selecting unit 18, which is obtained by the site accessing unit 20 using the acquisition objective information generated by the generating unit 19, from the site accessing unit 20 and displays the information on the screen 300A of the display device 300 through the image display controller 5.

Next, the configuration of the remote controller 100B will be described. As described above, the remote controller 100B accepts the control instruction of the user with respect to the processings which may be performed by the main body 100A, transmits the instruction to the main body 100A through the infrared ray, and allows the main body 100A to perform the processing with respect to the instruction. The remote controller 100B, as illustrated in FIG. 1, includes a numerical keypad 31, a shopping button 32, a program list button 33, and the arrow keypad 34. The numerical keypad 31 is a keypad that allows the user to input a number. The shopping button 32 is a button that allows the user to input the instruction to display a name of a shopping site which may be displayed by the main body 100A. The program list button 33 is a button that allows the user to input the instruction to display the program list. The arrow keypad 34 is a keypad that allows the user to select the program and the name of the site. The decision button is provided at the center of the arrow keypad 34. Even though not illustrated in FIG. 1, the above-mentioned detecting unit and infrared transmitting unit are mounted in the remote controller 100B. The detecting unit detects that the user presses the shopping button 32, the program list button 33, and the arrow keypad 34. The infrared transmitting unit transmits the signal indicating the pressed button detected by the detecting unit to the main body 100A through the infrared ray.

Next, the name and address information of one or more shopping sites stored in the site information providing device 200 which is obtained by the site information obtaining unit 12 which is the most important part of the first embodiment and the acquisition objective information generating rule will be described with reference to FIG. 5. FIG. 5 is a view illustrating an example of the names and address information of the four shopping sites and the acquisition objective information generating rule. FIG. 5 is an html text which includes the names and address information of the four shopping sites and the acquisition objective information generating rule.

Specifically, in the html text of FIG. 5, in a head part, that is, from <head> to </head>, four meta tags are defined. Each of the meta tags indicates the names of the shopping sites and the address information included in the sites.

More specifically, in each of the meta tags, a character string continuous to "shopping-site 1=" is the name of the shopping site. For example, in the first meta tag, "shopping-site 1="laplata.co.jp"" is written, which indicates that the name of the shopping site is "laplata.co.jp". In the html text of FIG. 5, as apparent from the four meta tags, as the names of the shopping sites, the names of the four shopping sites of "laplata.co.jp", "mahoo shopping", "nedan.com", and "bitter" are defined. Therefore, as described with reference to FIG. 4, the site name display controller 8 displays the list 308 of the names of the four shopping sites on the program list 303 of the screen 300A of the display device 300. Names of the same number of shopping sites as the number defined here are displayed in the list 308 of the names of the shopping sites.

The html text of FIG. 5 indicates that the acquisition objective information generating rule is a rule that generates the acquisition objective information for obtaining information of the webpage related to the keyword in one of the four shopping sites in each meta tag by "a character string interposed between the symbols" "next to start="+"a character string that is obtained by converting the keyword into a character code specified by the character string interposed between the symbols" "next to encode= and URL-encoding the character code"+"a character string interposed between the symbols" "next to tail=". The keyword is extracted by the extracting unit 16 of FIG. 1.

For example, when the user selects the program of the name of "Journey of Japanese Gourmet", the extracting unit 16 extracts "Journey of Japanese Gourmet" which is the name of the program as a keyword, and the user selects the shopping site of the name called "laplata.co.jp", the generating unit 19 of FIG. 1 analyzes the html text of FIG. 5 and generates the acquisition objective information for obtaining the information of the webpage related to the keyword called "Journey of Japanese Gourmet" in the shopping site of the name called "laplata.co.jp" as follows.

As apparent from the html text of FIG. 5, the meta tag of the shopping site of the name called "laplata.co.jp" is <meta encode="SJIS" shopping-site 1="laplata.co.jp" start="http://www.laplata.co.jp/s/keywords=" tail=""/>.

Since "the character string interposed between the symbols" "next to start= of the meta tag" is "start="http://www.laplata.co.jp/s/keywords="", the generating unit 19 extracts "http://www.laplata.co.jp/s/keywords=" from the meta tag as "the character string interposed between the symbols" "next to start=".

Next, since "the character string interposed between the symbols" "next to encode=" of the meta tag is "SJIS", the character code used when the keyword is converted is "shift JIS". Therefore, the generating unit 19 represents "Journey of Japanese Gourmet" extracted by the extracting unit 16 as a keyword by a character code of "shift JIS". In other words, the generating unit 19 converts the keyword called "Journey of Japanese Gourmet" into "0x93, 0xfa, 0x96, 0x7b, 0x83, 0x4f, 0x83, 0x8b, 0x83, 0x81, 0x82, 0xcc, 0x97, 0xb7". Further, "0x93, . . . , 0xb7" are written using a hexadecimal notation method of a C language. Further, the generating unit 19 URL-encodes the character string obtained by a specified character code. In the above example, the character string of "%93% fa%96% 7b%83O%83% 8b%83% 81% 82% cc%97% b7" is generated. Further, as described above, the specified character code is defined in the meta tag for every shopping site, and a character code which is specified for a shopping site of a name called "mahoo shopping" is "EUC (extended unix code: "unix" is a registered trade mark.)".

Next, the generating unit 19 recognizes that "a character string interposed between the symbols" "next to tail=" of the meta tag is not present.

Finally, the generating unit 19 generates "http://www.laplata.co.jp/s/keywords=%93% fa%96% 7b%83O%83% 8b%83% 81% 82% cc%97% b7" as the acquisition objective information for obtaining the information of the webpage related to the keyword called "Journey of Japanese Gourmet" in the shopping site called "laplata.co.jp" in accordance with the acquisition objective information generating rule. Further, in the first embodiment, the acquisition objective information is a URL for obtaining a search result of a webpage related to the keyword extracted by the extracting unit 16 in the shopping site selected by the user.

Figure 6:
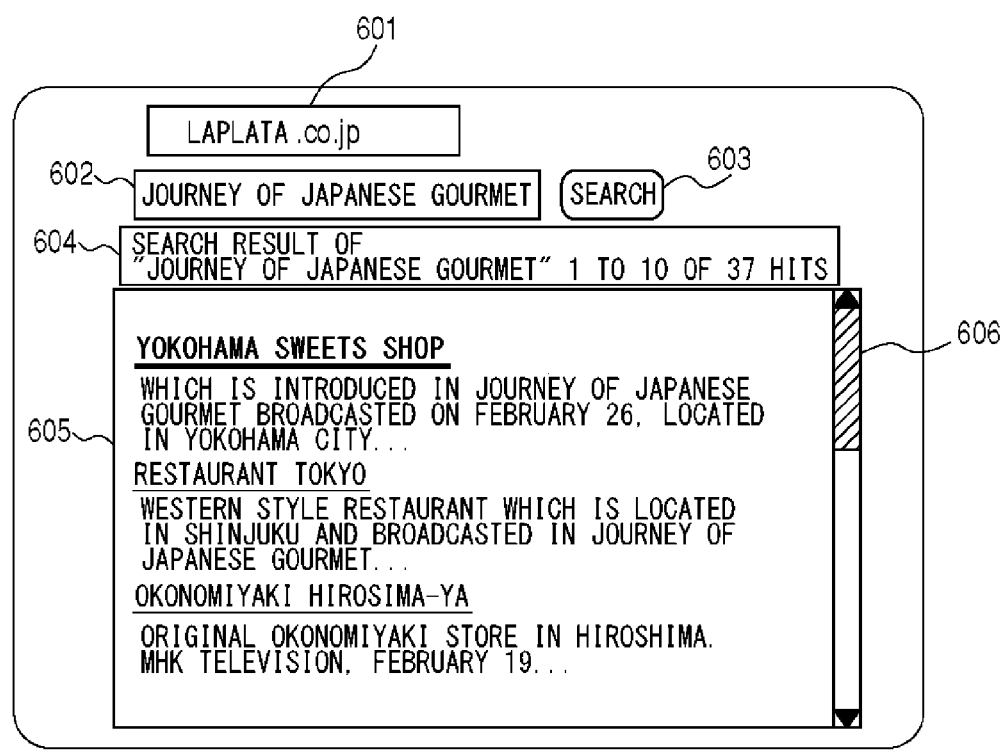
FIG. 6 is a view illustrating an example of a search result of a webpage related to a keyword called "Journey of Japanese Gourmet" at a shopping site called "laplata.co.jp"

The site accessing unit 20 obtains the information of the webpage related to the keyword called "Journey of Japanese Gourmet" in the shopping site called "laplata.co.jp" using the acquisition objective information generated by the generating unit 19. In other words, in the first embodiment, the site accessing unit 20 obtains the search result of the webpage related to the keyword called "Journey of Japanese Gourmet" in the shopping site of the name called "laplata.co.jp" using the acquisition objective information generated by the generating unit 19. The webpage information display controller 9, as illustrated in FIG. 6, displays the information obtained by the site accessing unit 20 on the screen 300A of the display device 300 through the image display controller 5. FIG. 6 is a view illustrating an example of a search result of a webpage related to a keyword of "Journey of Japanese Gourmet" at the shopping site of the name called "laplata.co.jp".

In the display of the information of the webpage of FIG. 6, a name display section 601 of the shopping site is provided at the uppermost part, and "laplata.co.jp" is displayed in the name display section 601 of the shopping site. A keyword display section 602 is provided below the name display section 601 of the shopping site, and "journey of Japanese gourmet" is displayed in the keyword display section 602. Further, in the display of the information of the webpage of FIG. 6, a search button 603 is displayed. Even though the search button 603 is originally a button for searching information of the webpage related to the keyword which is displayed in the keyword display section 602 in the shopping site having the name displayed in the name display section 601 of the shopping site, since the information is directly searched by specifying the URL, the search button 603 is not used in this time.

Further, in the display of the information of the webpage of FIG. 6, below the keyword display section 602 and the search button 603, a searched case number display section 604 is provided. The number of cases obtained by searching the information using the acquisition objective information generated by the generating unit 19 is displayed in the searched case number display section 604. More specifically, in the searched case number display section 604, the number of all searched cases and the number of cases which are currently displayed of the number of all searched cases are displayed.

Further, below the searched case number display section 604, a search result display section 605 is provided. In the search result display section 605, the result obtained by searching the information using the acquisition objective information generated by the generating unit 19 is displayed. In other words, in the search result display section 605, a search result of the webpage related to the keyword called "Journey of Japanese Gourmet" at the shopping site of the name called "laplata.co.jp" is displayed. More specifically, the search result corresponding to the number of cases which are currently displayed of all search results is displayed. In FIG. 6, three search results are displayed in the search result display section 605, and "Yokohama Sweet Shop" located at the top thereof is selected. Since "Yokohama Sweet Shop" is selected, "Yokohama Sweet Shop" is displayed in bold face. The user may select a desired option by pressing the up/down keys of the arrow keypad 34 of the remote controller 100B, which is similar to the searching of information by a PC. Further, at the right end of the search result display section 605, an up and down scroll bar 606 is provided. The up and down scroll bar 606 is a bar which is the same as the bar when the search result obtained at the time of searching the information by the PC is displayed and indicates where the information, which is displayed in the search result display section 605, is located in terms of the positions of the entire information. In FIG. 6, the up and down scroll bar 606 indicates that a search result near the heading among the entire search results is displayed.

In the shopping site having the name displayed in the name display section 601 of the shopping site, in order to search the information of the webpage related to the keyword displayed in the keyword display section 602, usually, it is required to press the search button 603. However, the generating unit 19 generates the acquisition objective information for searching the webpage related to the keyword called "Journey of Japanese Gourmet" at the shopping site of the name called "laplata.co.jp". By doing this, the user may obtain the search result of the webpage related to the keyword called "Journey of Japanese Gourmet" at the shopping site of the name called "laplata.co.jp" without inputting the character string nor pressing the search button 603. In other words, the generating unit 19 generates the acquisition objective information so that the user may obtain the search result of the webpage related to the keyword called "Journey of Japanese Gourmet" at the shopping site called "laplata.co.jp" without inputting the character string nor pressing the search button 603.

Figure 7:
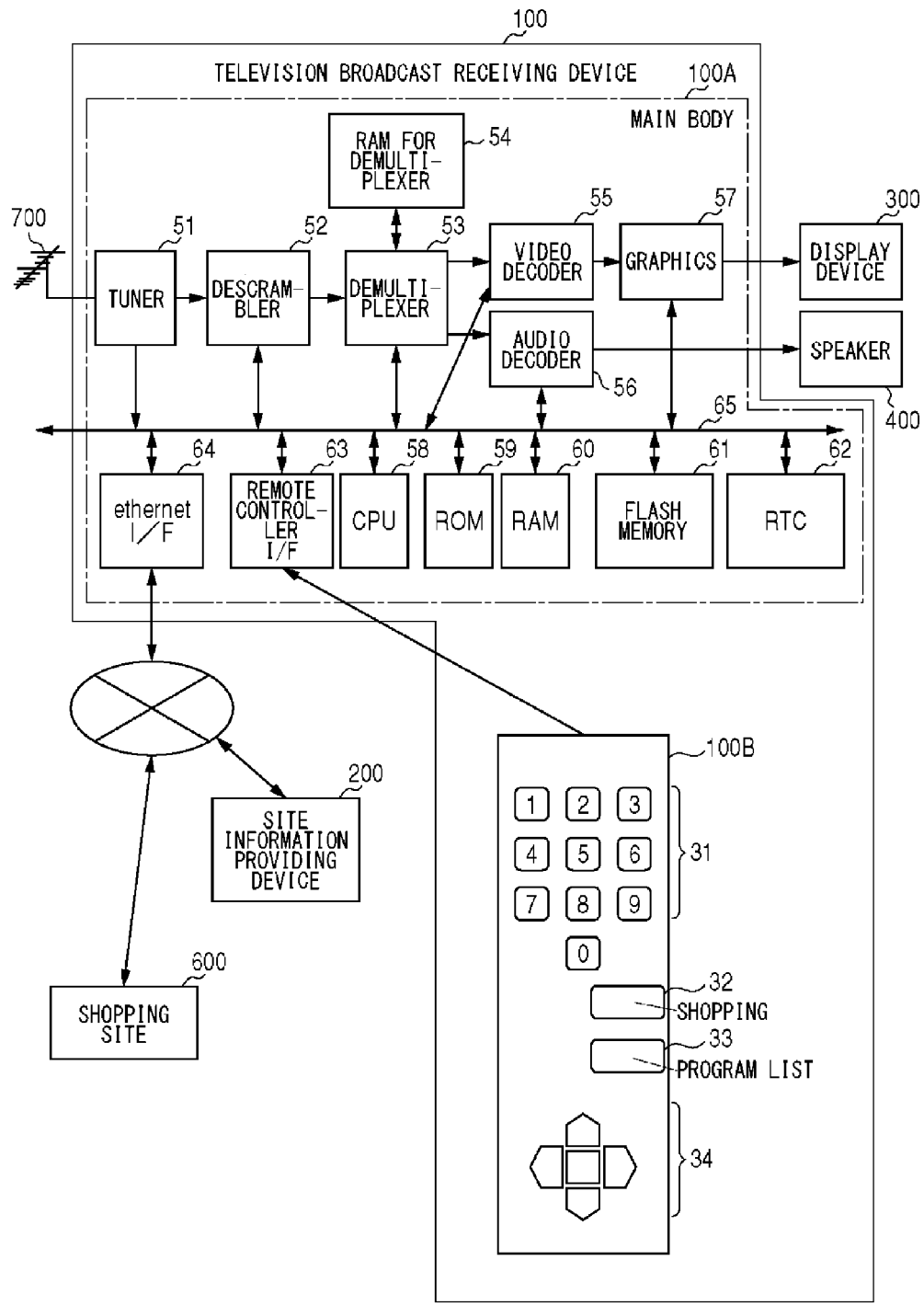
FIG. 7 is a second configuration view of a television broadcasting system according to the first embodiment.

As described above, FIG. 1 is a configuration view of the television broadcasting system according to the first embodiment focused on the function of the television broadcast receiving device 100. If it is focused on hardware of the television broadcast receiving device 100, the configuration of the television broadcasting system according to the first embodiment may be embodied as illustrated in FIG. 7. FIG. 7 is a configuration view of the television broadcasting system according to the first embodiment when being focused on the hardware of the television broadcast receiving device 100.

If it is focused on the hardware, the television broadcast receiving device 100 includes a tuner 51, a descrambler 52, a demultiplexer 53, a RAM 54 for demultiplexer, a video decoder 55, an audio decoder 56, a graphics 57, a CPU 58, a ROM 59, a RAM 60, a flash memory 61, a RTC 62, a remote controller I/F 63, an Ethernet I/F 64, and a bus 65. All hardware of the television broadcast receiving device 100 other than the bus 65 is connected to the bus 65.

When comparing FIG. 7 with FIG. 1, the tuner 51 receives the digital television broadcasting signal from a UHF antenna 700 to implement the function of the receiving unit 1 of FIG. 1. The descrambler 52 implements the function of the descrambling unit 2 of FIG. 1. The demultiplexer 53 implements the function of the demultiplex unit 3 of FIG. 1. The RAM 54 for demultiplexer implements the function of the broadcasting data storing unit 4 of FIG. 1. The video decoder 55 implements the function of the image display controller 5 of FIG. 1. The audio decoder 56 implements the function of the sound output controller 6 of FIG. 1.

The graphics 57 implements a part of the function of the image display controller 5 of FIG. 1 and the functions of the program list display controller 7, the site name display controller 8, and the webpage information display controller 9. The CPU 58 executes a program stored in the flash memory 61 to implement the functions of the configuring units in the television broadcast receiving device 100 of FIG. 1, if necessary. The ROM 59 stores information of fonts used to display characters. The RAM 60 implements the functions of the program information storing unit 11 and the site information storing unit 13 of FIG. 1. The flash memory 61 is a memory that continuously stores the information which has been stored by that time even when the power is turned off and stores information indicating which channel is selected and which program is watched by the user other than the above-mentioned program.

The RTC 62 is hardware which is not illustrated in FIG. 1. The RTC 62 is a clock that has a crystal oscillator therein. However, the RTC 62 may be a clock that obtains time information from the television broadcasting signal or a clock that obtains the time information through the Internet 500. The remote controller I/F 63 cooperates with the CPU 58 to implement the functions of the program list display instruction accepting unit 14, the program selecting unit 15, the site name display instruction accepting unit 17, and the site name selecting unit 18. The Ethernet I/F 64 cooperates with the CPU 58 to implement the functions of the program information obtaining unit 10, the site information obtaining unit 12, and the site accessing unit 20. More specifically, the Ethernet I/F 64 cooperates with the CPU 58 to be connected with the Internet 500 through the Ethernet 800 and implements the functions of the program information obtaining unit 10, the site information obtaining unit 12, and the site accessing unit 20 in accordance with the communication protocol such as TCP/IP or HTTP.

Figure 8:
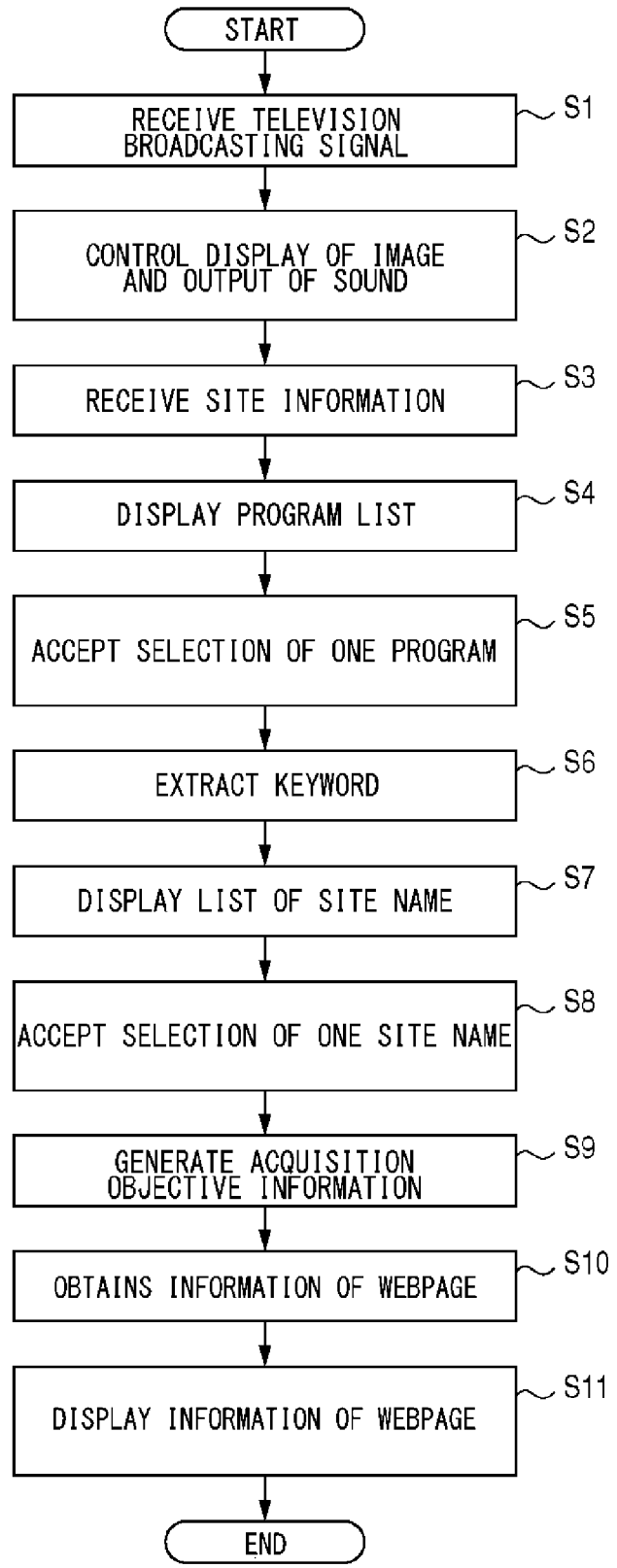
FIG. 8 is a flow chart illustrating procedures of operations of a television broadcast receiving device according to the first embodiment.

Next, the flow of the operation of the television broadcast receiving device 100 will be described with reference to FIG. 8. FIG. 8 is a flow chart illustrating procedures of operations of the television broadcast receiving device 100.

First, the receiving unit 1 accepts the selection of a channel of a television program which is watched by the user from the user, receives the digital television broadcasting signal, and extracts a signal of a channel selected by the user from the received television broadcasting signals to output the signal to the descrambling unit 2 (S1). If the television broadcasting signal from the receiving unit 1 is a scrambled signal, the descrambling unit 2 descrambles the television broadcasting signal to output the descrambled television broadcasting signal to the demultiplex unit 3. In contrast, if the television broadcasting signal output from the receiving unit 1 is not a scrambled signal, the descrambling unit 2 outputs the television broadcasting signal from the receiving unit 1 as it is to the demultiplex unit 3. The demultiplex unit 3 separates the digital television broadcasting signal from the descrambling unit 2 into video data, audio data, and program information to be stored in the broadcasting data storing unit 4.

The image display controller 5 receives and decodes the video data from the demultiplex unit 3 and displays an image corresponding to the decoded video data on the display device 300 (S2). The sound output controller 6 receives and decodes the audio data from the demultiplex unit 3 and outputs the sound corresponding to the decoded audio data outside the speaker 400 (S2).

The site information obtaining unit 12 accesses the site information providing device 200 through the Internet 500 and obtains the name and address information of one or more registered shopping sites and the acquisition objective information generating rule from the site information providing device 200 (S3). The site information storing unit 13 stores the name and address information of one or more registered shopping sites and the acquisition objective information generating rule which are obtained by the site information obtaining unit 12.

The program list display instruction accepting unit 14 accepts the instruction to display the program list. The program list display controller 7 obtains the program information from the broadcasting data storing unit 4 or the program information storing unit 11 in accordance with the instruction to display the program list from the program list display instruction accepting unit 14 and generates the program list based on the obtained program information. As illustrated in FIG. 2, the generated program list is displayed on the screen 300A of the display device 300 through the image display controller 5 (S4). The program selecting unit 15 accepts the selection and decision of one program from the program list 303 displayed on the screen 300A of the display device 300 (S5). The extracting unit 16 extracts a keyword related to the program which is finally selected and determined by the program selecting unit 15 from the program information stored by the broadcasting data storing unit 4 or from the program information stored by the program information storing unit 11 (S6).

The site name display instruction accepting unit 17 accepts the instruction to display the names of all shopping sites, and the site name display controller 8 obtains the names of one or more registered shopping sites from the site information storing unit 13 in accordance with the instruction to display the names of the all shopping sites. The site name display controller 8, as illustrated in FIG. 4, displays the list 308 of the names of the obtained registered shopping sites on the program list 303 of the screen 300A of the display device 300 through the image display controller 5 (S7). The site name selecting unit 18 accepts the selection and decision of the name of one site from the list 308 of the names of one or more registered shopping sites displayed on the screen 300A (S8).

The generating unit 19 is the most important part of the first embodiment and generates the acquisition objective information (URL) for obtaining information of a webpage related to the keyword extracted by the extracting unit 16 in the shopping site having a name finally determined by the site name selecting unit 18 in accordance with the acquisition objective information generating rule obtained by the site information obtaining unit 12 (S9). The site accessing unit 20 obtains the information of the webpage related to the keyword extracted by the extracting unit 16 in the shopping site having the name finally determined by the site name selecting unit 18 using the acquisition objective information (URL) generated by the generating unit 19 through the Internet 500 (S10). The webpage information display controller 9 displays the information of the webpage related to the keyword extracted by the extracting unit 16 in the shopping site having the name finally determined by the site name selecting unit 18, which is obtained using the acquisition objective information (URL), on the screen 300A of the display device 300 through the image display controller 5 (S11).

As described above, the television broadcast receiving device 100 displays the program list, selects and determines one program from the program list, and extracts a keyword related to the selected and determined program from the program list. The television broadcast receiving device 100 receives the instruction to display the shopping site from the user to display the name of one or more registered shopping sites, and selects and determines a name of one shopping site among the one or more registered shopping sites. Therefore, the television broadcast receiving device 100 generates the keyword extracted so as to be related to the selected and determined program and the acquisition objective information (URL) for obtaining the information of the webpage related to the extracted keyword in the shopping site having the selected and determined name. By doing this, even though the configuration of the query character string for the same shopping site is varied with the time, if the definition of the site information providing device of FIG. 5 is changed, the television broadcast receiving device 100 may access a specific site. Further by additionally deleting the definition of FIG. 5, the number of names of the shopping sites to be displayed in the list 308 of the names of the shopping sites may be changed. Further, it is possible to generate the acquisition objective information for obtaining the information of the webpage related to the keyword related to the program which is watched by the user from the shopping site selected by the user without inputting the characters by the user. In other words, the television broadcast receiving device 100 may increase the convenience of the user as compared with the related art when the user performs searching using Internet based on the program information.

Further, in above-described first embodiment, the functional configuration of the television broadcast receiving device 100 is described with reference to FIG. 1, and the configuration of the hardware of the television broadcast receiving device 100 is described with reference to FIG. 7. However, the functions of the configuring units of the television broadcast receiving device 100 and the site information providing device 200 may be implemented by cooperation of hardware such as a CPU (processor) and a memory of a computer with a computer program that implements the functions. Alternatively, the functions may be implemented by a dedicated circuit or by any forms. A computer program for implementing one or plural functions of all configuring units of the television broadcast receiving device 100 and the site information providing device 200 in the first embodiment may be stored in a recording medium.

Further, as described with reference to FIG. 5, the name and address information of the registered shopping site and the acquisition objective information generating rule are not limited to be included in the html text. The name and address information of the registered shopping site and the acquisition objective information generating rule may be a different format such as xml text.

Further, in the first embodiment, four shopping sites are specifically described as the shopping site, but the number of shopping sites may be arbitrary. Further, in the first embodiment, an example that uses a shopping button of the remote controller 100B when the name of the shopping site is displayed on the screen 300A of the display device 300 is described. However, other means may be used. For example, a means that displays a GUI on the screen 300A and displays the name of the shopping site on the screen 300A of the display device 300 by manipulating the GUI may be used.

The acquisition objective information generating rule which is used to allow the generating unit 19 to generate the acquisition objective information is not limited to the above-mentioned rule. For example, the rule may be a rule that switches the arrangement of the shopping site and the keyword or a rule that encrypts a part of the character string. In short, the acquisition objective information generating rule may be a rule for generating the acquisition objective information for obtaining the information of the webpage related to the keyword extracted by the extracting unit 16 at the site selected by the user.

Further, even though an example that uses the URL as the acquisition objective information is described, the present invention is not limited thereto, but other information such as information combining the URL and a User Agent may be used.

Furthermore, the keyword extracted by the extracting unit 16 is not limited to the name of the program. The keyword may be a performer of the program or the name of a land where the program is captured. The shopping site may be substituted with other types of web sites. For example, the shopping site may be substituted with a homepage of the performer.

Second Embodiment

Figure 9:
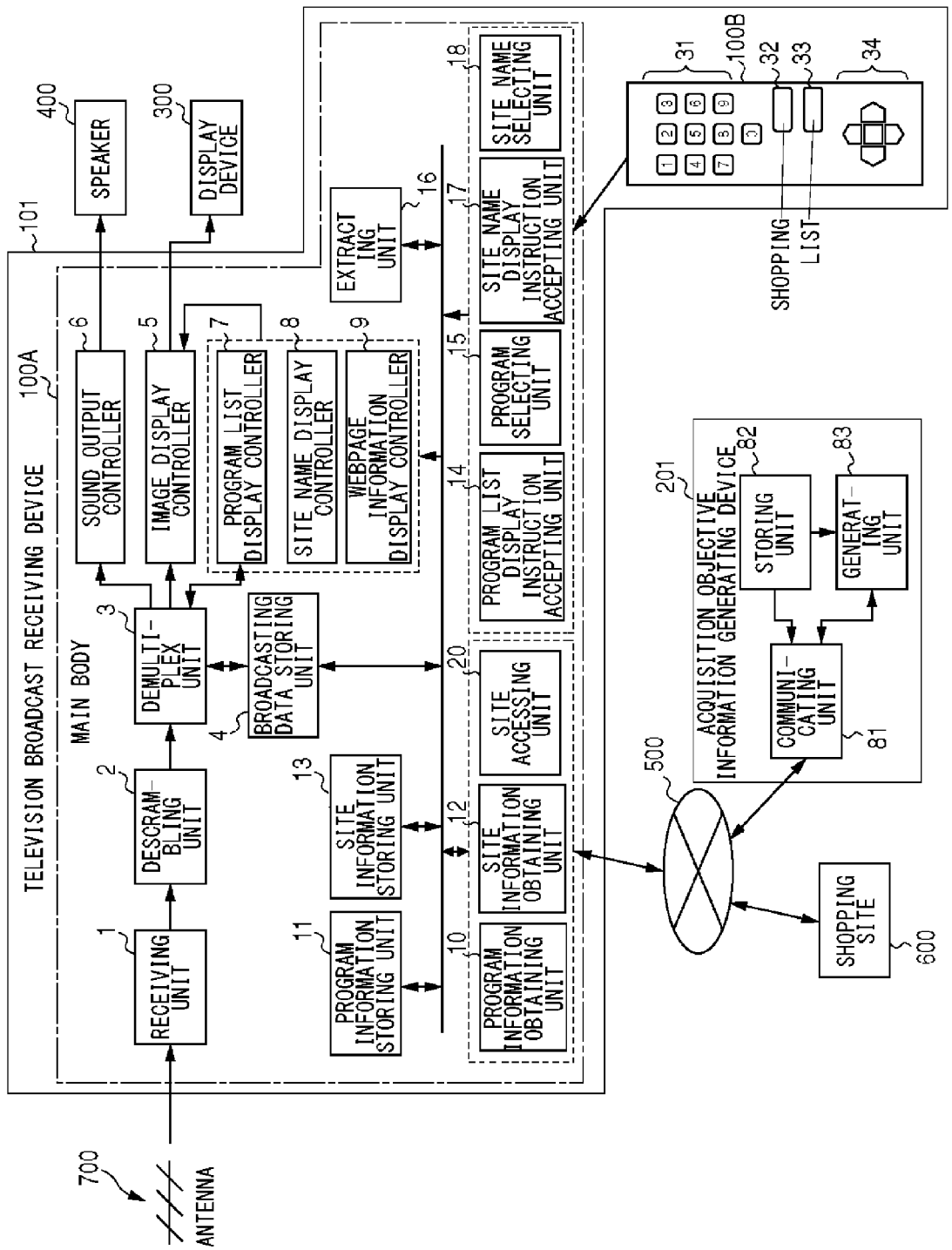
FIG. 9 is a configuration view of a television broadcasting system according to a second embodiment.

Next, the configuration of a television broadcasting system according to a second embodiment will be described with reference to FIG. 9. FIG. 9 is a configuration view of the television broadcasting system according to a second embodiment.

As illustrated in FIG. 9, the configuration of the television broadcasting system according to the second embodiment is substantially similar to the configuration of the television broadcasting system according to the first embodiment. However, the television broadcasting system according to the second embodiment is different from the television broadcasting system according to the first embodiment as follows. In the second embodiment, the difference from the first embodiment will be mainly described.

As illustrated in FIG. 9, the television broadcasting system according to the second embodiment includes a television broadcast receiving device 101 and an acquisition objective information generating device 201. The television broadcast receiving device 101 according to the second embodiment has most of the configuring units of the television broadcast receiving device 100 according to the first embodiment but does not have the generating unit 19. Alternatively, the acquisition objective information generating device 201 has a generating unit 83 which has the same function as the generating unit 19. Further, the acquisition objective information generating device 201 stores the same information as the information stored by the site information providing device 200 according to the first embodiment by a storing unit 82. However, the configuration of the information stored by the storing unit 82 is different from the configuration of the information stored by the site information providing device 200 according to the first embodiment. Further, the acquisition objective information generating device 201 has a communicating unit 81.

Figure 10:
FIG. 10 is a view illustrating that a storing unit of an acquisition objective information generating device of FIG. 9 individually stores names of four shopping sites and an acquisition objective information generating rule.

The storing unit 82 of the acquisition objective information generating device 201 stores names and address information of four shopping sites and an acquisition objective information generating rule for generating acquisition objective information for obtaining the information of the webpage related to an assigned keyword in one of one or more registered shopping sites. The storing unit 82 individually stores the names of the registered shopping sites, the address information thoseof, and the acquisition objective information generating rule, not in one text. FIG. 10 is a view illustrating that the storing unit 82 individually stores the names of the registered shopping sites and the acquisition objective information generating rule. Specifically, FIG. 10 is a view illustrating that the storing unit 82 individually stores a text file of shoppingsite.html that specifies the names of one or more registered shopping sites and a text file of URLtransfer.html that defines the acquisition objective information generating rule.

The names of the registered shopping sites stored by the storing unit 82 will be described with reference to FIG. 11. FIG. 11 is a view illustrating contents of the text file of shoppingsite.html that specifies the names of the four shopping sites stored by the storing unit 82. As apparent by comparing FIG. 11 with FIG. 5, the text file of shoppingsite.html includes only the character string defined by "shopping-site 1" from each meta tag of FIG. 5.

The site information obtaining unit 12 of the television broadcast receiving device 101 according to the second embodiment accesses the acquisition objective information generating device 201 through the Internet 500 in order to obtain the names of one or more registered shopping sites. In this case, the communicating unit 81 of the acquisition objective information generating device 201 transmits the text file of shoppingsite.html of FIG. 11 stored by the storing unit 82 to the site information obtaining unit 12 through the Internet 500. The site information obtaining unit 12 receives the text file of shoppingsite.html of FIG. 11 from the communicating unit 81 of the acquisition objective information generating device 201, analyzes that the names of the four shopping sites are present in the text file and stores the names of the four shopping sites in the site information storing unit 13. The site name display instruction accepting unit 17 displays the name of the four shopping sites stored in the site information storing unit 13 on the screen 300A of the display device 300 through the image display controller 5.

Similarly to the first embodiment, the extracting unit 16 extracts the keyword, and the site name selecting unit 18 accepts the name of one shopping site. By doing this, the site accessing unit 20 accesses the text file of URLtransfer.html stored by the storing unit 82 of the acquisition objective information generating device 201 through the Internet 500. The text file of URLtransfer.html, as described above, is a file that defines the acquisition objective information generating rule.

In this case, in order to allow the acquisition objective information generating device 201 to generate the acquisition objective information, the site accessing unit 20 adds the name of one shopping site which is selected and determined by the site name selecting unit 18 and the keyword extracted by the extracting unit 16 to access information to access the text file of URLtransfer.html stored by the storing unit 82 of the acquisition objective information generating device 201. Specifically, the site accessing unit 20 sets the name of the shopping site and the extracted keyword as parameters in a query string of the URL of the text file of URLtransfer.html.

More specifically, if it is assumed that the URL of the text file of URLtransfer.html is "http://www.URLServer.co.jp/URLtransfer.html", when the URL of the text file of URLtransfer.html is written in a status before being URL encoded so as to be easily understood, the site accessing unit 20 sets the name of the shopping site and the extracted keyword as parameters in a query string of the URL of the text file of URLtransfer.html so that the URL, for example, is "http://www.URLServer.co.jp/URLtransfer.html?site=laplata.co.jp&program=Journey of Japanese Gourmet". In the above example, the site accessing unit 20 sets the "laplata.co.jp", which is the name of the shopping site, in "site=" which is the first query and sets the name of the program "Journey of Japanese Gourmet", which is a keyword, in "program=" which is a second query.

The site accessing unit 20 finally URL-encodes "http://www.URLServer.co.jp/URLtransfer.html?site=laplata.co.jp&program=Journey of Japanese gourmet" and generates the URL in which the name of the shopping site and the extracted keyword are set as parameters in the query string of the URL of the text file of URLtransfer.html. In other words, the site accessing unit 20 finally generates a URL of "http://www.URLServer.co.jp/URLtransfer.html?site=%3d%83%89%83v%83%89%83%5e.co.jp&program=%93%fa%96%7b%83O%83%8b%83%81%82%cc%97%b7". Therefore, the site accessing unit 20 accesses the text file of URLtransfer.html stored by the storing unit 82 of the acquisition objective information generating device 201 using the generated URL.

In the acquisition objective information generating device 201 which is a main part of the second embodiment, the communicating unit 81 outputs the query string in the URL accessed by the site accessing unit 20 to the generating unit 83. The generating unit 83 analyses the URL to extract the first query and the second query and generates the acquisition objective information for obtaining the information of the webpage related to the keyword extracted by the extracting unit 16 in the shopping site of the name registered by the site name selecting unit 18 of the television broadcast receiving device 101 according to the second embodiment in accordance with the acquisition objective information generating rule stored by the storing unit 82. The communicating unit 81 transmits the acquisition objective information to the television broadcast receiving device 101 through the Internet 500 as the html text which is transited to the acquisition objective information (URL) generated by the generating unit 83. The site accessing unit 20 of the television broadcast receiving device 101, similarly to the first embodiment, receives the acquisition objective information from the acquisition objective information generating device 201 and obtains the information of the webpage related to the keyword extracted by the extracting unit 16 in the shopping site of the name selected and determined by the site name selecting unit 18 using the acquisition objective information.

Figure 12:
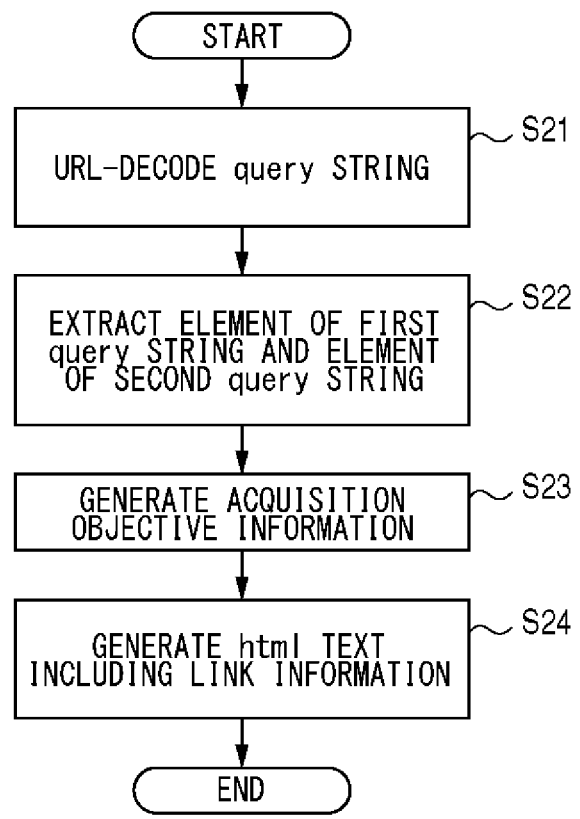
FIG. 12 is a first flow chart illustrating procedures of operations when a generating unit of an acquisition objective information generating device according to the second embodiment generates acquisition objective information.

Hereinafter, the operation when the generating unit 83 generates the acquisition objective information will be described with reference to FIG. 12. FIG. 12 is a first flow chart illustrating procedures of operations when the generating unit 83 of the acquisition objective information generating device 201 according to the second embodiment generates the acquisition objective information.

First, the generating unit 83 URL-decodes the query string in the URL used when the television broadcast receiving device 101 according to the second embodiment accesses the acquisition objective information generating device 201 (S21). In other words, the generating unit 83 URL-decodes "site=%3d%83%89%83v%83%89%83%5e.co.jp&program=%93%fa%96%7b%83O%83%8b%83%81%82%cc%97%b7" (S21).

Next, the generating unit 83 extracts an element of the first query string starting with Site= and an element of the second query string starting with program= (S22). In other words, the generating unit 83 extracts "laplata.co.jp" which is the name of the shopping site as an element of the first query string and extracts "Journey of Japanese Gourmet" which is the name of the program which is the keyword as an element of the second query string (S22).

Next, the generating unit 83 generates the acquisition objective information (URL) for obtaining the information of the webpage related to the keyword extracted by the extracting unit 16 in the shopping site of the name selected and determined by the site name selecting unit 18 in accordance with the acquisition objective information generating rule stored by the storing unit 82 (S23). The generating unit 83 may generate the acquisition objective information using an algorithm performed by the generating unit 19 of the first embodiment or may generate the acquisition objective information using other algorithms. The generating unit 83 may generate the acquisition objective information using a CGI program or a servlet having higher degree of freedom as a means of executing the algorithm.

Figure 13:
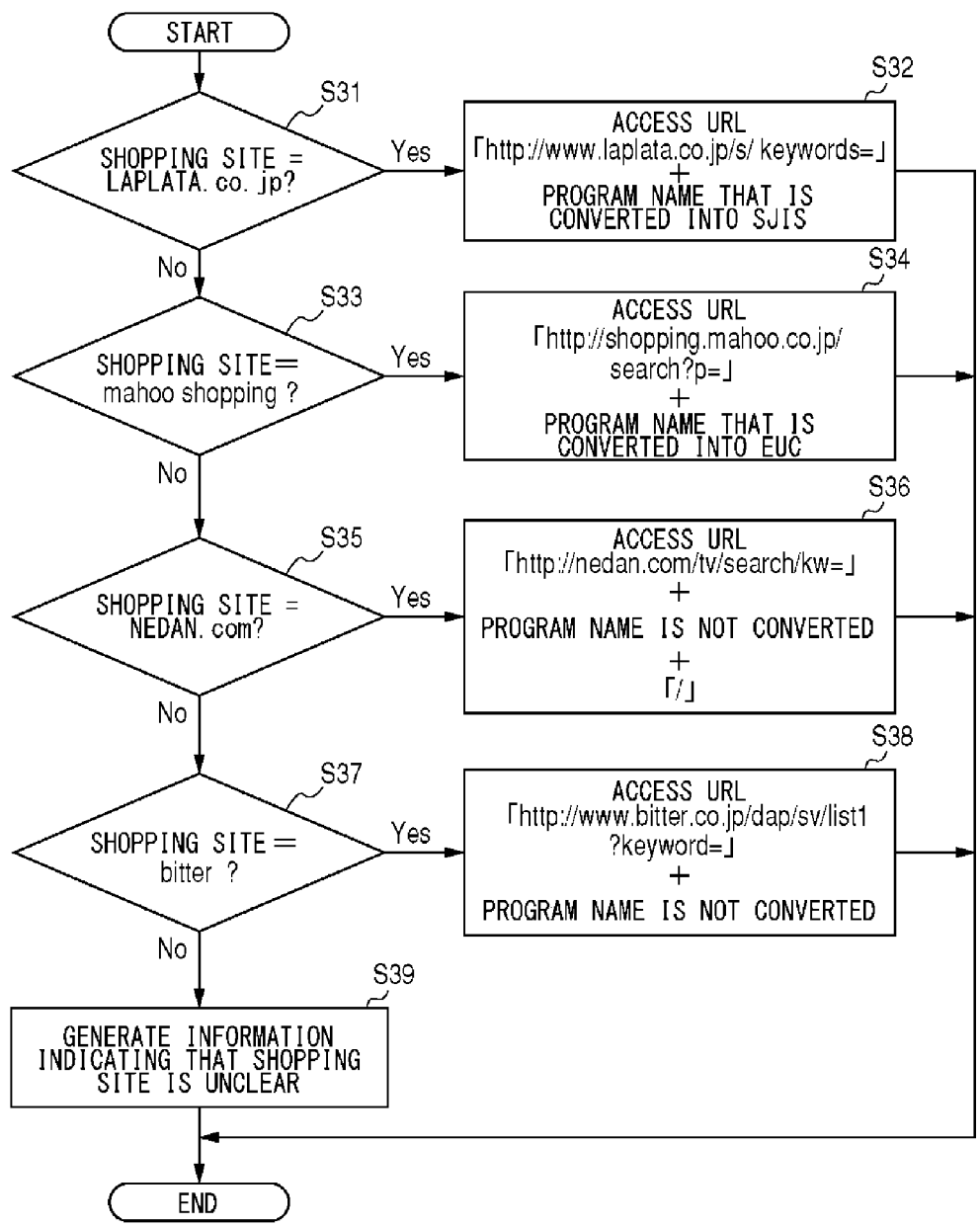
FIG. 13 is a second flow chart illustrating procedures of operations when a generating unit of an acquisition objective information generating device according to the second embodiment generates acquisition objective information.

An operation when the generating unit 83 generates the acquisition objective information using an algorithm that is performed by the generating unit 19 according to the first embodiment will be described with reference to FIG. 13. FIG. 13 is a second flow chart illustrating procedures of operations when the generating unit 83 of the acquisition objective information generating device 201 according to the second embodiment generates the acquisition objective information.

First, the generating unit 83 judges whether the name of the shopping site is "laplata.co.jp" (S31). If it is judged that the name of the shopping site is "laplata.co.jp" (Yes in S31), the generating unit 83 converts <"http://www.laplata.co.jp/s/ keywords="+program name> into SJIS to generate the URL encoded character string as the acquisition objective information (S32).

In step 31, if it is judged that the name of the shopping site is not "laplata.co.jp" (No in S31), the generating unit 83 judges whether the name of the shopping site is "mahoo shopping" (S33). If it is judged that the name of the shopping site is "mahoo shopping" (Yes in S33), the generating unit 83 converts <"http://www.shopping.co.jp/search?P="+program name> into EUC to generate the URL encoded character string as the acquisition objective information (S34).

In step S33, if it is judged that the name of the shopping site is not "mahoo shopping" (No in S33), the generating unit 83 judges whether the name of the shopping site is "nedan.com" (S35). If it is judged that the name of the shopping site is "nedan.com" (Yes in S35), the generating unit 83 URL encodes <a character string of "http://nedan.com/tv/search/kw="> to be generated as acquisition objective information (S36).

In step S35, if it is judged that the name of the shopping site is not "nedan.com" (No in S35), the generating unit 83 judges whether the name of the shopping site is "bitter" (S37). If it is judged that the name of the shopping site is "bitter" (Yes in S37), the generating unit 83 URL encodes a character string of <"http://www.bitter.co.jp/dap/sv/list1?keyword="> to be generated as acquisition objective information (S38).

In step S37, if it is judged that the name of the shopping site is not "bitter" (No in S37), the generating unit 83 generates the acquisition objective information indicating that the name of the shopping site is unclear (S39). See FIG. 12, again.

In step 24 which is the next step of step S23 in FIG. 12, the generating unit 83 generates a html text so as to be transited into the acquisition objective information (URL) generated in step S23. Specifically, in a head element of the html text, the following Equation 1 is described, and the html text including Equation 1 to which the character string of Equation 1 is linked is generated (S24).

<meta http-equiv="Refresh" content="0;
URL=acquisition objective information(URL)"> [Equation 1]

Finally, the communicating unit 81 transmits the html text in which Equation 1 is included, that is, the html text in which the acquisition objective information is included to the television broadcast receiving device 101 through the Internet 500. The site accessing unit 20 of the television broadcast receiving device 101 receives the html text in which information which will be transited into the acquisition objective information from the acquisition objective information generating device 201 is included and analyzes the html text to obtain information of the webpage related to the keyword extracted by the extracting unit 16 at the shopping site having the name accepted by the site name selecting unit 18 similarly to the first embodiment. In other words, the site accessing unit 20 operates as a normal html browser. Therefore, the site accessing unit 20 obtains the information of the webpage related to the keyword called "Journey of Japanese Gourmet" at the shopping site called "laplata.co.jp" illustrated in FIG. 6.

As described above, in the second embodiment, rather than the television broadcast receiving device 101, the acquisition objective information generating device 201 generates the acquisition objective information. In the second embodiment, it is possible to generate the acquisition objective information using an algorithm having a higher degree of freedom than that in the first embodiment. Further, only the generating unit 83 of the acquisition objective information generating device 201 is changed to change the algorithm to be generated. Furthermore, it is possible to generate the acquisition objective information for obtaining the information of the webpage related to a keyword related to a program which is watched by the user from the shopping site selected by the user without inputting the character by the user.

Also in the above-described second embodiment, the functions of the configuring units of the television broadcast receiving device 101 and the acquisition objective information generating device 201 may be implemented by cooperation of hardware such as a CPU (processor) and a memory of a computer with a computer program that implements the functions. Alternatively, the functions may be implemented by a dedicated circuit or by any forms. A computer program for implementing one or plural functions of all configuring units of the television broadcast receiving device 101 and the acquisition objective information generating device 201 in the second embodiment may be stored in a recording medium.

If information obtained by using the acquisition objective information is a search result of the webpage related to the keyword related to the program which is watched by the user in the shopping site selected by the user, the acquisition objective information may be search result acquisition objective information.

Third Embodiment

Figure 14:
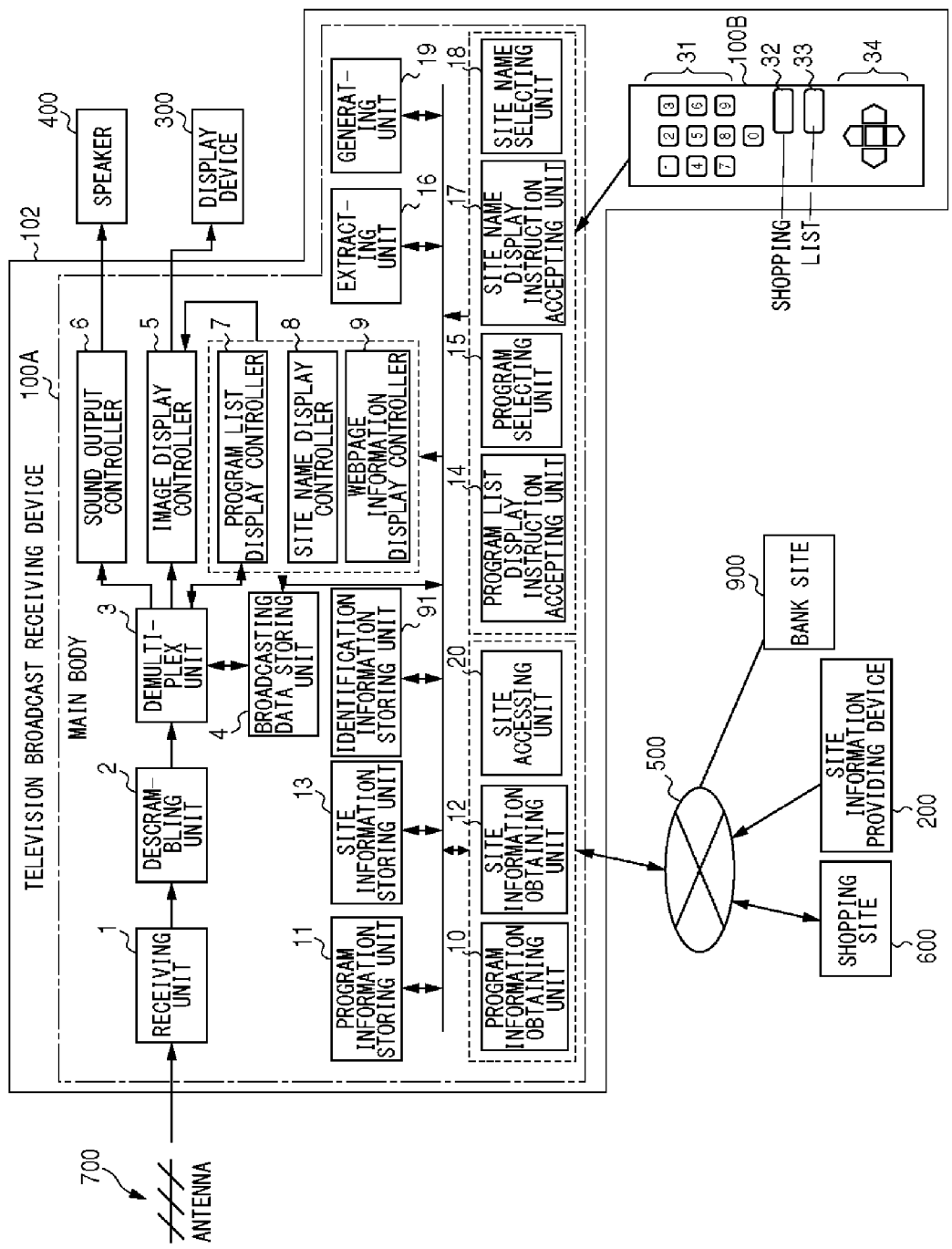
FIG. 14 is a configuration view of a television broadcasting system according to a third embodiment.

Next, the configuration of a television broadcasting system according to a third embodiment will be described with reference to FIG. 14. FIG. 14 is a configuration view of the television broadcasting system according to a third embodiment.

As illustrated in FIG. 14, the configuration of the television broadcasting system according to the third embodiment is substantially similar to the configuration of the television broadcasting system according to the first embodiment. However, the television broadcasting system according to the third embodiment is different from the television broadcasting system according to the first embodiment as follows. In the third embodiment, the difference from the first embodiment will be mainly described.

As illustrated in FIG. 14, the television broadcasting system according to the third embodiment includes a television broadcast receiving device 102 and a site information providing device 200. The television broadcast receiving device 102 according to the third embodiment has all of the configuring units of the television broadcast receiving device 100 according to the first embodiment. The television broadcast receiving device 102 according to the third embodiment further includes an identification information storing unit 91 that stores a unique query string as individual identification information of the television broadcast receiving device 102. Further, in FIG. 14, a bank site 900 is displayed.

In the first embodiment, when the acquisition objective information is generated, the generating unit 19 generates the acquisition objective information using the name of one shopping site selected and determined by the site name selecting unit 18 and the keyword extracted by the extracting unit 16. In contrast, in the third embodiment, the generating unit 19 generates the acquisition objective information also using the unique query string which is stored by the identification information storing unit 91. By doing this, it is possible to access the shopping site using the generated acquisition objective information. Further, with respect to the above-mentioned "unique", every television broadcast receiver may be unique or every model may be unique.

It is assumed that the information for generating the acquisition objective information is the html text which is equivalent to FIG. 5, as illustrated in FIG. 15. FIG. 15 is a view illustrating an example of an html text including information for generating acquisition objective information which is equivalent to FIG. 5. In the html text of FIG. 15, a character string called "affiliate="&afid=abcd1234"" is added to the end of the name of the shopping site called "laplata.co.jp" which is defined by the first meta tag.

If there is a html text "character string starting with affiliate=" of FIG. 15, the generating unit 19 adds "character string next to affiliate= of the meta tag" behind the acquisition objective information which is described using the first embodiment, and generates "character string behind start= of meta tag"+"a thing obtained by converting selected program name (Journey of Japanese Gourmet) into a predetermined character code specified by the character string behind encode= and URL-encoding the character code"+"character string behind tail= of meta tag"+"character string behind affiliate= of meta tag" as new acquisition objective information (URL).

In the html text of FIG. 15, "character string next to affiliate= of meta tag" is "&afid=abcd1234". Accordingly, the generating unit 19 generates an URL as acquisition objective information by adding this at the end.

The site accessing unit 20 of the television broadcast receiving device 102 according to the third embodiment accesses a shopping site 600 using the URL generated by the generating unit 19. When the shopping site 600 is accessed, if a character string of "&afid=" is included in the query string, the shopping site 600 recognizes that a specific television broadcast receiving device 102 accesses the shopping site 600, and specifies an accessing source by a character string of "abcd1234" which is next to "&afid".

Thereafter, if the user does the shopping at the shopping site 600 through the site accessing unit 20 of the television broadcast receiving device 102, the shopping site 600 recognizes a price corresponding to the shopping. The shopping site 600 has a table of bank accounts corresponding to each of the accessing sources. Therefore, the shopping site 600 transfers a predetermined percentage of the prices for the shopping, for example, 3% of the price to a bank account linked to "abcd1234" of a bank site 900 through the Internet 500 as a compensation for introducing the shopping site 600. In other words, the shopping site 600 transfers a predetermined percentage of the prices for the shopping to a bank account of a user of the television broadcast receiving device 102 of the bank site 900 through the Internet 500.

Further, in the third embodiment, the site accessing unit 20 transmits the information that specifies the accessing source by the query string to the shopping site 600 as the individual identification information. However, the site accessing unit 20 may transmit the information that specifies the accessing source, that is, the individual identification information of the television broadcast receiving device 102 to the shopping site 600 by means other than the query string, for example, a User Agent.

Further, in the system according to the second embodiment, the site accessing unit 20 of the television broadcast receiving device 101 may transmit the individual identification information of the television broadcast receiving device 101, that is, information that specifies the accessing source to the shopping site 600. Further, also in the system according to the second embodiment, the shopping site 600 may transfer a predetermined percentage of the prices for the shopping to a bank account of a user of the television broadcast receiving device 101 of the bank site 900 through the Internet 500.

Further, in the above example, an example that uses information in which the query string is inserted in the URL as the information of the accessing source is described. However, the present invention is not limited thereto, but information combining the URL and the User Agent may be used or other information may be used.

As means for transmitting the information to the accessing destination, other communicating means such as Ethernet (registered trade mark) or a cellular phone network may be used.

What is claimed is:

1. A television broadcast receiving device, comprising:
a receiving unit configured to receive a television broadcasting signal;
an image display controller configured to decode image data of a program included in the television broadcasting signal received by the receiving unit to display an image on a display device;
a program information obtaining unit configured to obtain program information including at least a broadcasting start time and a program name of a program which is included in the television broadcasting signal to be broadcasted;
a program list display controller configured to generate a program list based on the program information obtained by the program information obtaining unit and display the generated program list on the display device;
a program selecting unit configured to select one of programs in the program list displayed by the display device based on the external manipulation;
an extracting unit configured to extract a keyword related to the program selected by the program selecting unit from the program information obtained by the program information obtaining unit;
a site information obtaining unit configured to obtain names and address information of one or plural web sites and an acquisition objective information generating rule for every one or plural web sites for generating acquisition objective information indicating an address of a web page in the web site based on the keyword by directly using the keyword extracted by the extracting unit from HTTP servers;
a site name display controller configured to display the names of one or plural web sites obtained by the site information obtaining unit on the display device;
a site name selecting unit configured to select a name of one web site among the names of the one or plural web sites displayed by the display device based on external manipulation; and
a generator configured to generate the acquisition objective information indicating an address of a web page in the web site based on the keyword for directly obtaining information of the webpage using http protocol by concatenating the keyword extracted by the extracting unit in the web site having the name selected by the site name selecting unit with the address information obtained by the site information obtaining unit, such concatenation differing according to each site name, by using the acquisition objective information generating rule which is defined according to each site name, including adding information necessary for acquisition objective information generation, obtained by the site information obtaining unit from the acquisition objective information generating rule defined for that web site.

2. A television broadcast receiving device, comprising:
a broadcasting signal receiving unit configured to receive a television broadcasting signal;
an image display controller configured to decode image data of a program included in the television broadcasting signal received by the broadcasting signal receiving unit to display an image on a display device;

a program information obtaining unit configured to obtain program information including at least a broadcasting start time and a program name of a program which is included in the television broadcasting signal to be broadcasted;

a program list display controller configured to generate a program list based on the program information obtained by the program information obtaining unit and display the generated program list on the display device;

a program selecting unit configured to select one of programs in the program list displayed by the display device based on the external manipulation;

an extracting unit configured to extract a keyword related to the program selected by the program selecting unit from the program information obtained by the program information obtaining unit;

a site information obtaining unit configured to obtain names of one or plural web sites;

a site name display controller configured to display the names of one or plural web sites obtained by the site information obtaining unit on the display device;

a site name selecting unit configured to select a name of one web site among the names of the one or plural web sites displayed by the display device based on external manipulation;

a transmitting unit configured to transmit the name of the web site selected by the site name selecting unit and the keyword extracted by the extracting unit to an HTTP server; and an access information receiving unit configured to receive acquisition objective information indicating an address of a web page in the web site based on the keyword for obtaining information of a webpage based on the keyword using http protocol generated from the keyword extracted by the extracting unit in the web site with the name selected by the site name selecting unit by the HTTP server, generated respectively to the site name.

3. The television broadcast receiving device according to claim 1, further comprising:

an identification information storing unit configured to store unique identification information of the device; and a site accessing unit configured to access the web site having the name selected by the site name selecting unit, wherein the web site having the name selected by the site name selecting unit is a shopping web site and the site accessing unit transmits the unique identification information stored by the identification information storing unit to the shopping web site for affiliating the shopping website from which receiving device the shopping is done thus to change the conditions of the shopping when accessing the shopping web site having the name selected by the site name selecting unit.

4. The television broadcast receiving device according to claim 2, further comprising:

an identification information storing unit configured to store unique identification information of the device; and a site accessing unit configured to access the web site having the name selected by the site name selecting unit, wherein the web site having the name selected by the site name selecting unit is a shopping web site and the site accessing unit transmits the unique identification information stored by the identification information storing unit to the shopping web site for affiliating the shopping web site from which receiving device the shopping is done thus to change the conditions of the shopping when accessing the shopping web site having the name selected by the site name selecting unit.

* * * * *